(12) United States Patent
Karlsson et al.

(10) Patent No.: US 9,397,578 B2
(45) Date of Patent: Jul. 19, 2016

(54) VOLTAGE FEED-FORWARD COMPENSATION AND VOLTAGE FEEDBACK COMPENSATION FOR SWITCHED MODE POWER SUPPLIES

(75) Inventors: Magnus Karlsson, Oskarshamn (SE); Anders Kullman, Kalmar (SE); Jonas Malmberg, Farjestaden (SE); Fredrik Wahledow, Farjestaden (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 117 days.

(21) Appl. No.: 14/379,098

(22) PCT Filed: Feb. 17, 2012

(86) PCT No.: PCT/EP2012/052764
§ 371 (c)(1),
(2), (4) Date: Aug. 15, 2014

(87) PCT Pub. No.: WO2013/120534
PCT Pub. Date: Aug. 22, 2013

(65) Prior Publication Data
US 2015/0029760 A1    Jan. 29, 2015

(51) Int. Cl.
*H02M 1/14* (2006.01)
*H02M 3/335* (2006.01)
(Continued)

(52) U.S. Cl.
CPC ............ *H02M 3/33546* (2013.01); *H02M 1/08* (2013.01); *H02M 1/14* (2013.01); *H02M 2001/0012* (2013.01); *H02M 2001/0016* (2013.01); *H02M 2001/0022* (2013.01)

(58) Field of Classification Search
CPC ............ G05F 1/00; H02M 1/08; H02M 1/14; H02M 2001/0012; H02M 2001/0016; H02M 2001/0022; H02M 2001/0025; H02M 3/33546

USPC ................. 323/283, 284, 285, 288, 299, 301; 700/44, 45, 298
See application file for complete search history.

(56) References Cited

U.S. PATENT DOCUMENTS

| 4,585,990 A | 4/1986 | Murphy |
| 4,692,737 A | 9/1987 | Stikvoort |

(Continued)

FOREIGN PATENT DOCUMENTS

| EP | 1241583 | 9/2002 |
| WO | WO-2011-103928 | 9/2011 |

(Continued)

OTHER PUBLICATIONS

PCT Notification of Transmittal of the International Search Report and the Written Opinion of the International Searching Authority for Counterpart PCT Application No. PCT/EP2012/052764, (Jan. 4, 2013), 13 pages.

(Continued)

*Primary Examiner* — Gary L Laxton
*Assistant Examiner* — Jye-June Lee
(74) *Attorney, Agent, or Firm* — NDWE LLP (57) ABSTRACT

A digital control unit generates a control signal to control a duty cycle of a switched mode power supply such that a faster response to an input voltage transient is achieved. The digital control unit comprises a feedback compensator, a feed forward compensator, a transient detector, and a controller. The transient detector receives a signal indicative of the input voltage of the switched mode power supply and detects transients on the received signal. The feedback compensator receives a signal indicative of the output voltage of the switched mode power supply and adjusts the control signal. The feed forward compensator receives a signal indicative of the input voltage of the switched mode power supply, performs a relatively fast, but coarse, adjustment of the control signal, and then performs a more accurate, but relatively slow, adjustment of the control signal.

16 Claims, 8 Drawing Sheets

(51) Int. Cl.
*H02M 1/08* (2006.01)
*H02M 1/00* (2006.01)

(56) References Cited

U.S. PATENT DOCUMENTS

| | | | |
|---|---|---|---|
| 4,891,744 | A | 1/1990 | Yamamoto et al. |
| 5,602,591 | A | 2/1997 | Saiki |
| 7,239,257 | B1 | 7/2007 | Alexander et al. |
| 7,269,034 | B2 | 9/2007 | Schlecht |
| 7,272,021 | B2 | 9/2007 | Schlecht et al. |
| 7,558,083 | B2 | 7/2009 | Schlecht |
| 7,564,702 | B2 | 7/2009 | Schlecht |
| 7,787,261 | B2 | 8/2010 | Farrington et al. |
| 8,085,024 | B2 | 12/2011 | Prodic et al. |
| 8,285,502 | B2 | 10/2012 | Kenly et al. |
| 2007/0096706 | A1 | 5/2007 | Terakado et al. |
| 2008/0215264 | A1 | 9/2008 | Spanier et al. |
| 2010/0231183 | A1 | 9/2010 | Jan et al. |
| 2012/0032660 | A1* | 2/2012 | Nakamura ............ H02M 3/156 323/288 |
| 2012/0049908 | A1 | 3/2012 | Karlsson et al. |
| 2012/0153919 | A1 | 6/2012 | Garbossa et al. |

FOREIGN PATENT DOCUMENTS

| | | |
|---|---|---|
| WO | WO-2012-002825 | 1/2012 |
| WO | WO-2012-103941 | 8/2012 |
| WO | WO-2012-116750 | 9/2012 |
| WO | WO-2013-113354 | 8/2013 |

OTHER PUBLICATIONS

PCT Notification of Transmittal of the International Preliminary Report on Patentability for Counterpart PCT Application No. PCT/EP2012/052764, (Feb. 7, 2014), 7 pages.
PCT International Search Report for PCT Application No. PCT/EP2010/052468, (Oct. 19, 2010), 5 pages.
PCT Notification Concerning Transmittal of the International Preliminary Report on Patentability, including the Written Opinion of the International Searching Authority, for PCT Application No. PCT/EP2010/052468, (Sep. 7, 2012), 8 pages.
PCT International Search Report for PCT Application No. PCT/EP2011/051476, (Dec. 12, 2012), 4 pages.
PCT International Preliminary Report on Patentability, including the Written Opinion of the International Searching Authority, for PCT Application No. PCT/EP2011/051476, (Aug. 6, 2013), 8 pages.
PCT International Search Report for PCT Application No. PCT/EP2011/053177, (Feb. 1, 2012), 3 pages.
PCT International Preliminary Report on Patentability, including the Written Opinion of the International Searching Authority, for PCT Application No. PCT/EP2011/053177, (May 10, 2013), 14 pages.
PCT International Search Report for PCT Application No. PCT/EP2012/051429, (Nov. 2, 2012), 4 pages.
Arbetter, et al., "Feedforward pulse width modulators for switching power converters", *Power Electronics, IEEE Transactions on* (vol. 12, Iss. 2), (Mar. 1997), pp. 361-368.
Barry, M., "Design Issues in Regulated and Unregulated Intermediate Bus Converters", *Applied Power Electronics Conference and Exposition, APEC '04, Nineteenth Annual IEEE*, (2004), pp. 1389-1394, vol. 3.
Calderone, et al., "Optimal feed-forward compensation for for PWM DC/DC converters with 'linear' and 'quadratic' conversion ratio", *Power Electronics, IEEE Transactions on* (vol. 7, Issue 2), (Apr. 1992), pp. 349-355.
Kazimierczuk, et al., "Open-loop peak voltage feedforward control of PWM buck converter", *Circuits and Systems I: Fundamental Theory and Applications, IEEE Transactions on* (vol. 47, Iss. 5), (May 2000), pp. 740-746.
Mattavelli, et al., "Predictive digital control of power factor preregulators using disturbance observer for input voltage estimation", *Power Electronics Specialist Conference, 2003. PESC '03. 2003 IEEE 34th Annual* (vol. 4), (Jun. 15-19, 2003), pp. 1703-1708.
Sjoroos, et al., "Dynamic performance of buck converter with input voltage feedforward control", *Power Electronics and Applications, 2005 European Conference on*, (2005), 9 pages.
Syed, et al., "Digital PWM Controller with Feed-Forward Compensation", *Applied Power Electronics Conference and Exposition Confernce and Exposition, APEC '04, Nineteenth Annual IEEE* (vol. 1), (2004), pp. 60-66.
Zhang, et al., "Digital PWM/PFM Controller with Input Voltage Feed-Forward for Synchronous Buck Converters", *Applied Power Electronics Conference and Exposition, 2008. APEC 2008. Twenty-Third Annual IEEE*, (2008), pp. 523-528.

* cited by examiner

VOLTAGE FEED-FORWARD COMPENSATION AND VOLTAGE FEEDBACK COMPENSATION FOR SWITCHED MODE POWER SUPPLIES

CROSS-REFERENCE TO RELATED APPLICATIONS

This application is a National stage of International Application No. PCT/EP2012/052764, filed Feb. 17, 2012, which is hereby incorporated by reference.

TECHNICAL FIELD

The present invention relates generally to the field of switched mode power supplies (sometimes referred to as switch mode power supplies or switching mode power supplies) and more specifically to a digital control unit for a switched mode power supply, the digital control unit providing an improved response to an input voltage transient.

BACKGROUND

The switched mode power supply (SMPS) is a well-known type of power converter having a diverse range of applications by virtue of its small size and weight and high efficiency. For example, SMPSs are widely used in personal computers and portable electronic devices such as cell phones. An SMPS achieves these advantages by switching a switching element such as a power MOSFET at a high frequency (usually tens to hundreds of kHz), with the frequency or duty cycle of the switching being adjusted using a feedback signal to convert an input voltage to a desired output voltage.

An SMPS may take the form of a rectifier (AC/DC converter), a DC/DC converter, a frequency changer (AC/AC) or an inverter (DC/AC).

In most SMPS topologies, the voltage of the output signal, $V_{out}$ is directly proportional to the voltage of the input signal, $V_{in}$:

$$V_{out} \propto D V_{in} \quad \text{Equation 1}$$

In Equation 1 above, D is the duty cycle of the switching.

To minimise the difference between the actual output voltage and the desired output voltage, the duty cycle is usually controlled in dependence upon a feedback signal, wherein the feedback signal is an error signal between a measured output voltage and a desired output voltage. The error signal is fed back to a feedback compensator that controls the duty cycle so that the measured output voltage is adjusted to the desired output voltage.

It is preferable for the output signal of the SMPS to remain at its desired voltage level under all conditions. However, it is difficult to maintain the desired output voltage level due to transients on the input signal.

A transient is a change in the input signal to the SMPS. Transients on the input signal can cause the output voltage level to change almost immediately.

In known SMPS designs, only the inertia in an output filter of the SMPS will decrease this effect. In addition, the error signal fed back to the feedback compensator is often too slow in changing the duty cycle and so a large transient is introduced on the output voltage.

Figure 1:
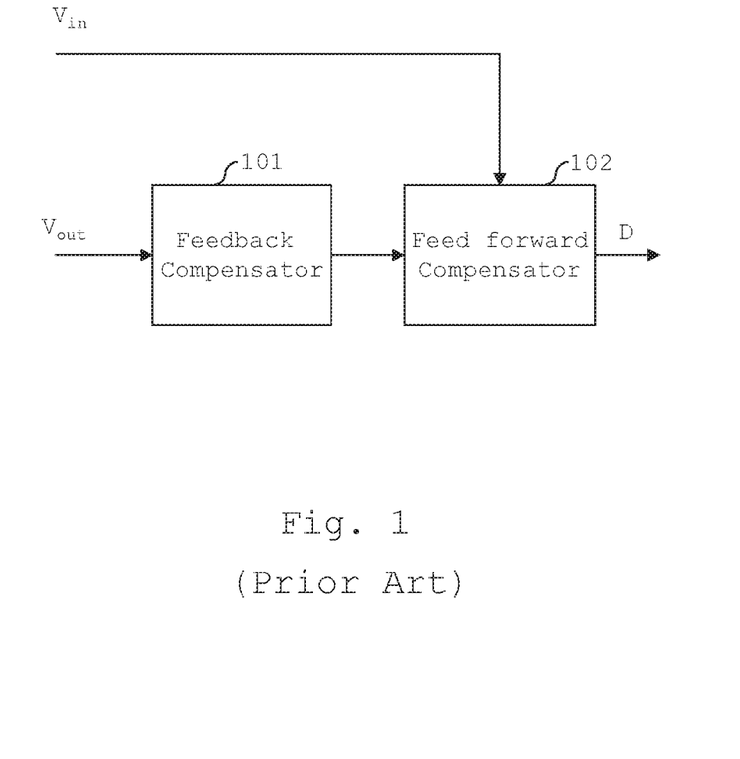
FIG. 1 is a block diagram of a known design of a control unit comprising a feedback compensator in cascade with a feed forward compensator.

A known solution to the problems caused by input transients is to cascade a feed forward compensator 102 with a feedback compensator 101 as shown in FIG. 1.

In the cascade, or series, arrangement shown in FIG. 1, the feedback compensator 101 calculates a duty cycle for an SMPS (not shown in FIG. 1). The feed forward compensator 102, which is separate from the feedback compensator, calculates and applies feed forward compensation to adjust the duty cycle that has already been calculated by the feedback unit 101.

Known feed forward systems based on the arrangement of FIG. 1 are disclosed in:

Calderone, L. Pinola, V. Varoli, "Optimal feed-forward compensation for PWM DC/DC converters with "linear" and "quadratic" conversion ratio, *IEEE trans, Power Electron.*, vol. 7, No. 2, pp 349-355, April 1992.

B. Arbetter and D. Marksimovic, "Feedforward Pulse Width Modulators for Switching Power Converters," *IEEE trans, Power Electron.*, vol. 12, no. 2, pp 361-368, March 1997.

M. K. Kazimierczuk, A. J. Edstron, "Open-loop peak voltage feedforward control of PWM Buck converter" *IEEE trans. Circuits and Systems* I, vol. 47, No. 5, pp. 740-746, May 2000.

J.-P. Sjoroos, T. Suntio, J. Kyyra, K. Kostov, "Dynamic performance of buck converter with input voltage feedforward control," *European Conference on Power Electronics and Applications*, 2005.

Figure 2:
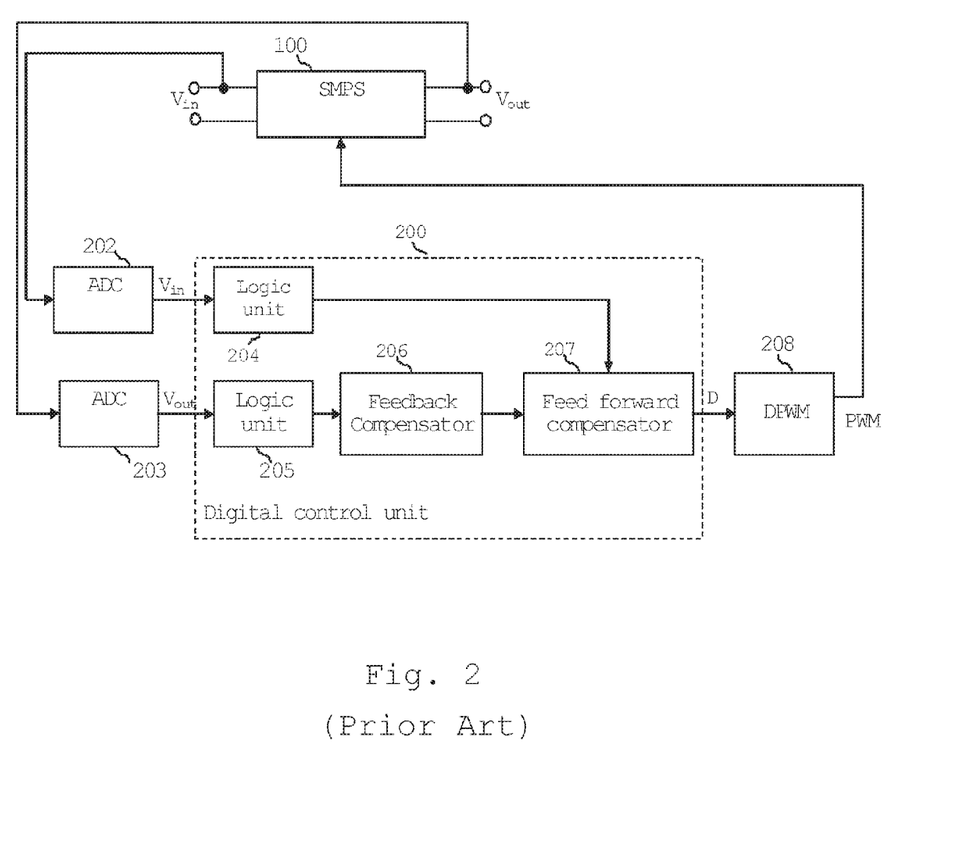
FIG. 2 is a schematic diagram showing a known design of a digital control unit arranged to control a digital pulse width modulator that generates switching pulses to control an SMPS.

An SMPS 100 controlled by a digital control unit 200 is shown in FIG. 2.

The voltages of the input and output signals of the SMPS 100 are sampled and converted to digital samples by analogue-to-digital converters (ADCs) 202 and 203.

Logic units 204 and 205 are used for transforming the samples into a form suitable for processing by the digital control unit and for noise filtering.

The output voltage samples from logic unit 205 are fed to the feedback compensator 206, which applies a control law such as a proportional-integral-difference (PID), also referred to as proportional-integral-differential or proportional-integral-derivative, control law.

It will be appreciated that the PID control law is just one example of a suitable control law for determining the duty cycle of a SMPS. Many alternative control laws are also possible, such as PI, PD, P, I and FIR for example.

Referring again to FIG. 2, the output from the feedback compensator 206 is adjusted by the feed forward compensator 207, in dependence upon the input voltage samples from the logic unit 204, to produce a compensated duty cycle control signal.

The feed forward compensation reduces the effects that transients on the input voltage have on the output voltage of the SMPS 100.

The compensated duty cycle control signal D is output from the digital control unit 200 and is fed to a digital pulse width modulator 208. The digital pulse width modulator 208 translates the duty cycle control signal from a digital format to a pulse width modulated (PWM) duty cycle signal. The PWM signal is then output to control the switching elements of the SMPS 100.

SMPS control units that use a feedback compensator and a feed forward compensator, such as those described above, suffer from a number of problems.

For example, the calculation of the compensated duty cycle control signal by the control unit results in long computation times and increased power consumption.

Moreover, a complex and time-consuming division operation with an additional multiplication has to be performed every switch period even when the input voltage is stable.

An additional problem with known digital feed forward compensators is that, when the voltage of the input signal is located near a quantization level of the ADC for measuring the input signal, noise can cause the quantized version of the input signal to change. The feed forward compensation will then introduce transients on the output signal even when the input signal is nearly constant.

A further problem is experienced when the input signal is changing slowly and feedback is compensating for the changes. When the voltage of the input signal then changes from one quantization level to the next, the feed forward compensation will add additional compensation which introduces transients on the output signal.

Yet a further problem with known SMPS control units is that, at light load, energy can be transferred back and forth in isolated DC/DC converters and this makes the input voltage rise. This also triggers the feed forward compensation and introduces output voltage noise.

Moreover, the inherent delay that results from taking a measurement of the input voltage $V_{in}$ to performing the corrective action on the duty cycle will, in itself, cause a transient, which must be compensated for.

SUMMARY

The present inventors have realised that one reason for the long computation times to calculate the compensated duty cycle control signal lies in the calculation of a feed forward compensated duty cycle control signal.

The present invention is therefore designed to include a course, very low computation feed forward compensation process which allows a longer computation time for a more accurate and more computation-expensive feed forward computation process. As a result, action to a detected voltage transient may be performed more rapidly. This results in an improved robustness against input voltage transients.

According to the present invention, there is provided a method of generating a digital control signal for controlling the duty cycle of a switched mode power supply. The method comprises receiving a signal indicative of the input voltage of the switched mode power supply, receiving a signal indicative of the output voltage of the switched mode power supply and detecting a transient on the received signal indicative of the input voltage of the switched mode power supply. Furthermore, in response to the detection of a said transient, the method comprises performing a voltage feedback adjustment of the control signal for controlling the duty cycle of the switched mode power supply by adjusting the control signal in dependence upon the signal indicative of the output voltage, performing a coarse voltage feed forward adjustment of the control signal for controlling the duty cycle of the switched mode power supply by setting the value of the control signal to a value derived by performing at least one arithmetic shift operation on the value of the control signal, and performing a more accurate voltage feed forward adjustment of the control signal for controlling the duty cycle of the switched mode power supply by setting the value of the control signal to a value calculated in dependence upon the signal indicative of the input voltage of the switched mode power supply.

The present invention also provides a digital control unit operable to control the duty cycle of a switched mode power supply. The digital control unit comprises a feedback compensator, a feed forward compensator, a transient detector and a controller. The feedback compensator is arranged to receive a signal indicative of the output voltage of the switched mode power supply and is operable to adjust a control signal for controlling the duty cycle of the switched mode power supply in dependence upon the signal indicative of the output voltage. The feed forward compensator is operable to receive a signal indicative of the input voltage of the switched mode power supply and is operable to perform a coarse adjustment of a control signal for controlling the duty cycle of the switched mode power supply by setting the value of the control signal to a value derived by performing at least one arithmetic shift operation on a value of the control signal and operable to perform a more accurate adjustment of the control signal for controlling the duty cycle of the switched mode power supply by setting the value of the control signal to a value calculated in dependence upon the signal indicative of the input voltage. The transient detector is operable to receive a signal indicative of the input voltage of the switched mode power supply and is operable to detect transients on the received signal. The controller is operable to control the operation of the feedback compensator and the feed forward compensator in dependence upon the detection of a transient by the transient detector, such that, in response to the detection of a transient by the transient detector: in a feedback duty cycle control process, the feedback compensator adjusts the control signal for controlling the duty cycle of the switched mode power supply in dependence upon the signal indicative of the output voltage; in a coarse voltage feed forward duty cycle control process, the feed forward compensator adjusts the control signal to a value derived by performing at least one arithmetic shift operation on the value of the control signal; and in a more accurate voltage feed forward cycle control process, the feed forward compensator adjusts the control signal to a value calculated in dependence upon the signal indicative of the input voltage of the switched mode power supply.

LIST OF FIGURES

Embodiments of the present invention will now be described, by way of example only, with reference to the accompanying drawings, in which like reference numbers are used for like elements, and in which.

DETAILED DESCRIPTION OF EMBODIMENTS

Figure 3:
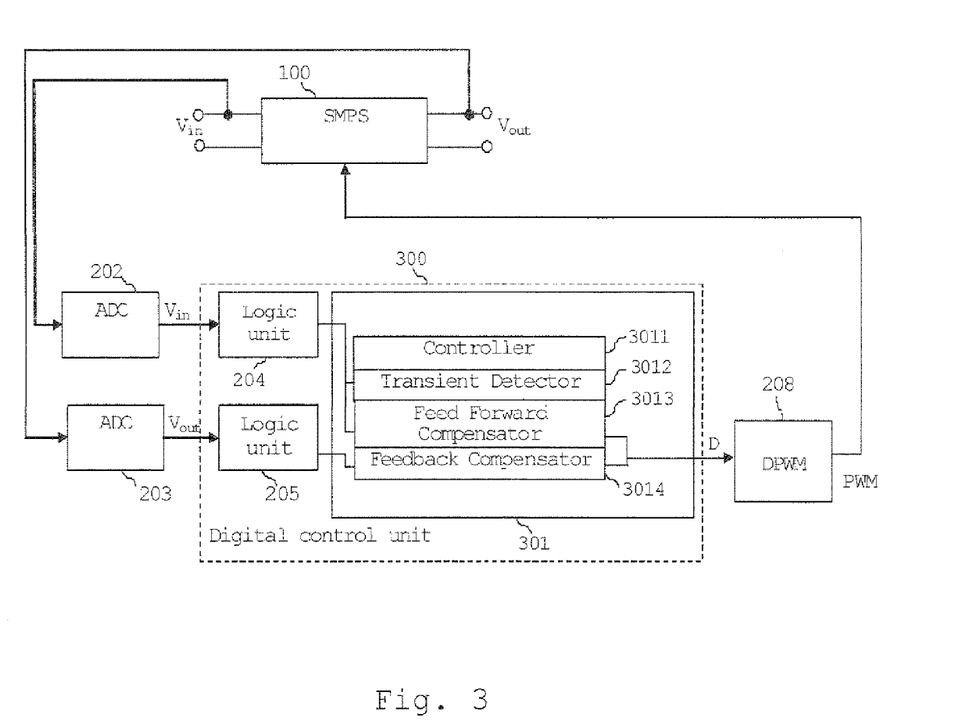
FIG. 3 is a schematic diagram showing a design of a digital control unit according to one embodiment of the present invention.

FIG. 3 depicts an SMPS controlled by a digital control unit 300 according to a first embodiment of the present invention.

Referring to FIG. 3, the digital control unit 300 is arranged to receive signals indicative of the input voltage $V_{in}$ and the output voltage $V_{out}$ of the SMPS 100. The input signals may comprise analogue signals of the voltages themselves or digital signals containing information defining voltage values measured by measurement equipment (not shown). In this embodiment, however, analogue signals are employed, and the analogue signals are passed to ADCs 202 and 203. The ADCs 202, 203, the logic units 204, 205 and the DPWM 208 perform the same operations as those described above with reference to FIG. 2, and accordingly will not be described again here.

The digital control unit 300 comprises a feedback compensator 3014, a feed forward compensator 3013, a transient detector 3012 and a controller 3011.

The feedback compensator 3014 and feed forward compensator 3013 may be arranged in a cascaded series arrangement or in an integrated arrangement. Examples of integrated arrangements are disclosed in international patent applications PCT/EP2010/052468 and PCT/EP2011/051476, the full contents of which are incorporated herein by cross-reference.

Transient detector 3012 is operable to receive a signal indicative of the input voltage $V_{in}$ of the switched mode power supply 100 and is operable to detect transients on the received signal.

The feedback compensator 3014 is arranged to receive a signal indicative of the output voltage $V_{out}$ of the switched mode power supply 100 and is operable to perform feedback compensation by adjusting the control signal D for controlling the duty cycle of the switched mode power supply 100 in dependence upon the signal indicative of the output voltage $V_{out}$ and a reference voltage. The value of the reference voltage may be fixed or variable. The use of a fixed reference voltage is well known. Variable reference voltages are disclosed in co-pending PCT Application PCT/EP2011/053177 and co-pending PCT Application PCT/EP2012/051429, the full contents of both of these applications being incorporated herein by cross-reference.

The feed forward compensator 3013 is operable to receive a signal indicative of the input voltage $V_{in}$ of the switched mode power supply 100 and is operable to perform feed forward compensation in two stages, namely a first stage in which relatively fast, but coarse feed forward compensation is performed, and a second stage in which a slower, but more accurate feed forward compensation is performed. More particularly, the feed forward compensator 3013 is operable in a first mode to perform a coarse adjustment of the control signal D for controlling the duty cycle of the switched mode power supply 100 by performing at least one arithmetic shift operation on a value of the control signal D. The feed forward compensation in this first mode therefore exploits the fact that an arithmetic shift operation can be performed very quickly to adjust the control signal D by a predetermined amount.

The operation of the feed forward compensator 3013 permits a fast response to an input voltage transient since it utilises the easiest and fastest mathematical operation in many CPU or similar, which is the arithmetic shift operation. That is a multiplication with a factor $$D_{new} = \begin{cases} D_{old}2^N & \text{leftshift} \\ D_{old}2^{-N} & \text{rightshift} \end{cases} \quad \text{Equation 1}$$

where N is the number of bitshifts. Bitshifts can therefore be used in order to provide an improved response when an input voltage transient occurs. As a result, a new value of the duty cycle control signal D can be calculated very quickly, thereby reducing the effects of the input voltage transient whilst creating time to compute a more accurate compensation. It can also compensate for the delay in system. By performing the first stage of feed forward compensation in this way and by overcompensating the first duty cycle control signal pulse, the overall output voltage transient can be reduced quickly.

The feed forward compensator 3013 is further operable in a second mode to perform a more accurate adjustment of the control signal D for controlling the duty cycle of the switched mode power supply 100 by setting the value of the control signal D to a value calculated in dependence upon the signal indicative of the input voltage $V_{in}$. The time to carry out the calculation for the accurate adjustment is provided by carrying out the coarse adjustment first so that the effect of an input voltage transient is reduced quickly, albeit in a coarse way. Example equations for calculating the more accurate value of the duty cycle control signal are provided later in the description.

In summary therefore, the feed forward compensator 3013 initially calculates a coarse value for the duty cycle control signal. This calculation is performed using computationally inexpensive bitshift operations which permit the rapid calculation. In this embodiment the coarse duty cycle control signal is calculated to be 50% of the current duty cycle control signal D, although other percentages could be used instead, such as 25% or 37.5%.

After causing a rapid response to the input voltage transient by performing the coarse adjustment, then the feed forward compensator 3013 can start and complete calculation of a more accurate value for the duty cycle control signal D based on the value of the input Voltage $V_{in}$.

Referring again to FIG. 3, the controller 3011 is operable to control the operation of the feedback compensator 3014 and the feed forward compensator 3013, as will be explained below.

Figure 4:
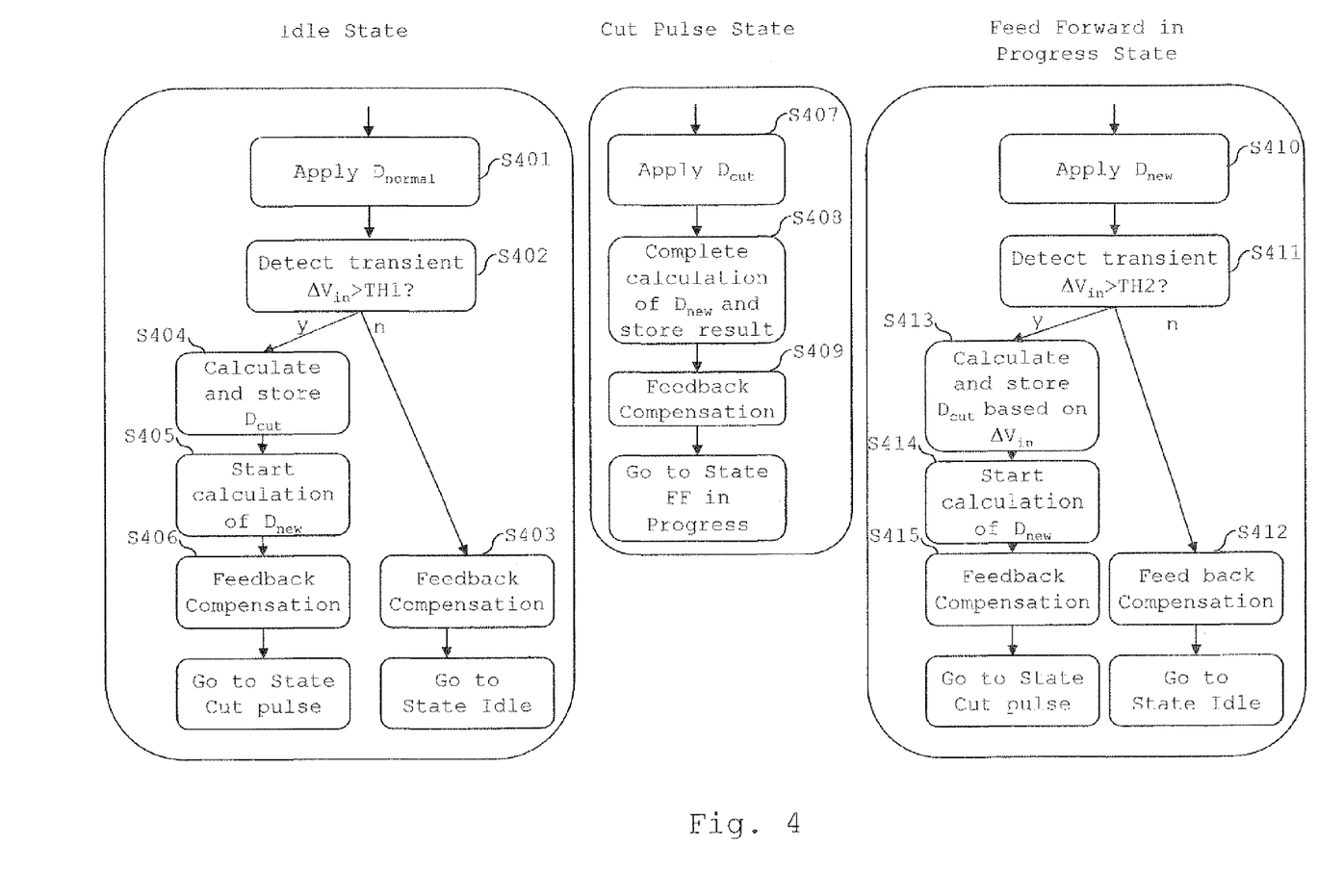
FIG. 4 is a state diagram showing the processes that are performed by the digital control unit of FIG. 3.
Figure 5A:
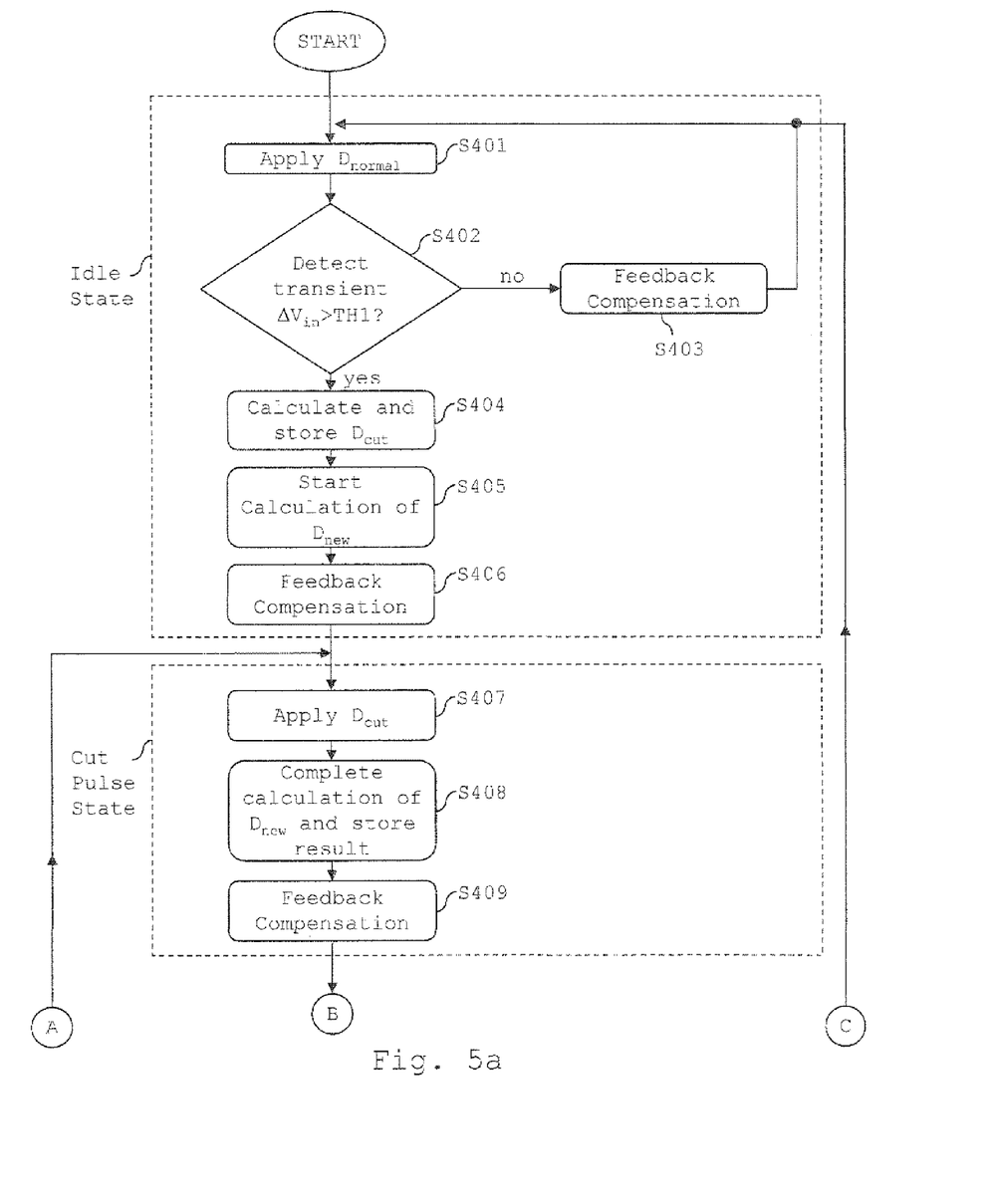
FIGS. 5a and 5b comprise a flow chart showing the processes of the state diagram in FIG. 4 that are performed by the digital control unit of FIG. 3.
Figure 5B:
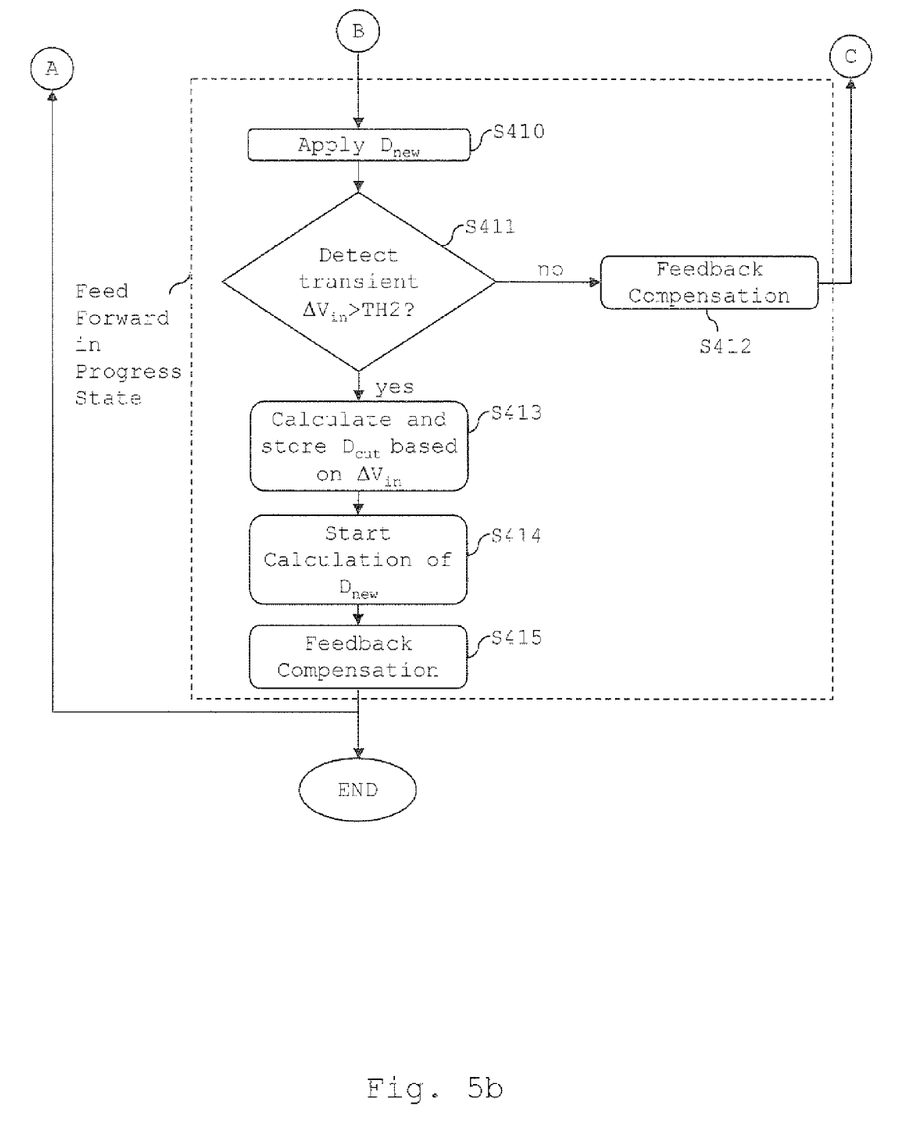

FIG. 4 shows a state machine diagram of the compensation processing operations performed by the digital control unit 300, with a flowchart of the operations in each state. FIGS. 5a and 5b depict the processing operations in a conventional flowchart format. The same reference numbers for the processes have therefore been used in FIGS. 4, 5a and 5b. It should be noted that, although the figures depict only positive input voltage changes (transients), the present invention also extends to include negative input voltage changes (transients) as well.

Each of the states in FIG. 4, namely Idle, Cut Pulse and Feed Forward in Progress, take one duty switch cycle to execute. If no voltage feed forward compensation is performed then the duty cycle control signal is set to the normal operation duty cycle control signal $D_{normal}$, which is calculated purely by the feedback compensator 3014.

Referring to FIGS. 4, 5a and 5b, in the Idle State, firstly in process S401 the current, normal operation duty cycle control signal $D_{normal}$ is applied.

The transient detector 3012 then checks in process S402 whether a transient has occurred by measuring whether a change in the input voltage $V_{in}$ is larger than a predetermined threshold TH1. In this embodiment TH1 is set to 3Q, where Q is the quantization step in the ADC 202, and Q=0.6V. It will be appreciated, however, that the present invention is not limited to these values and any appropriate value of TH1 and Q may be chosen.

If no transient is detected in process S402, then feedback compensation is performed in process S403 by the feedback compensator 3014 on the basis of the signal indicative of the output voltage $V_{out}$ of the SMPS and a reference voltage $V_{ref}$.

On the other hand, if a transient is detected in process S402, then in process S404 feed forward compensator 3013 calculates and stores a first, coarse value, $D_{cut}$, for the duty cycle control signal. Since $D_{cut}$ is calculated using the above-described bitshift operation(s), then its value can be calculated and stored quickly. More particularly, as $D_{cut}$ is calculated as 50% of the current duty cycle value in the present embodiment, a right shift of 1 bit is performed. It should be noted that the calculated value $D_{cut}$ is not actually applied to adjust the duty cycle control signal at this time, but instead is stored for subsequent application.

In process S405, feed forward compensator 3013 starts calculating a more accurate, value, $D_{new}$, for the duty cycle control signal using a suitable compensation formula and taking into account the input voltage $V_{in}$, as described below. As noted above, this calculation is slower than calculating $D_{cut}$, and therefore the calculation is unlikely to be completed in process S405.

In process S406, feedback compensation is performed by the feedback compensator 3004 based on the signal indicative of the output voltage $V_{out}$ and a reference voltage.

In the next switch cycle, operation passes to the Cut Pulse State. In this state, firstly, in process S407, feed forward compensator 3013 applies the previously calculated value $D_{cut}$ to adjust the duty cycle control signal. As a result, action is taken by the digital control unit 300 to correct the input voltage transient by applying this value $D_{cut}$ instead of waiting for $D_{new}$ to be calculated. Consequently, the digital control circuit 300 responds quickly to an input voltage transient to reduce its effect on the output voltage $V_{out}$ of the SMPS 100.

In process S408 feed forward compensator 3013 completes the calculation of the accurate value $D_{new}$ for the duty cycle control signal. Once the calculation has been completed, the result is stored for subsequent application.

In process S409, feedback compensator 3014 performs feedback compensation based on the signal indicative of the output voltage $V_{out}$ of the SMPS 100 and a reference voltage.

It should be noted that processes S407 and S409 may be performed in sequence or in parallel. Furthermore, if the feedback compensator 3014 and feed forward compensator 3013 are arranged in an integrated manner (for example as described in PCT/EP2010/052468 or PCT/EP2011/051476), then processes S407 and S409 may be performed in an integrated way to generate only one value of the control signal.

In the next switch cycle, operation passes to the Feed Forward in Progress State. In this state, feed forward compensator 3013 firstly applies the previously stored value $D_{new}$ to adjust the duty cycle control signal in process S410.

In process S411, transient detector 3012 detects whether a transient is still occurring on the input voltage $V_{in}$ of the SMPS 100 by detecting whether a change in the input voltage $V_{in}$ of the SMPS 100 is greater than a predetermined second threshold, TH2. In this embodiment the second threshold is set equal to the first threshold TH1 used in process S402. That is, the second threshold TH2 is set equal to 3Q, where Q is the quantization step in the ADC 202, and Q=0.6V. It will be appreciated, however, that the second threshold TH2 need not be the same as the first threshold TH1, and that any appropriate value of TH2 may be set.

If no transient is detected in process S411, then feedback compensation is performed by the feedback compensator 3014 in process S412 on the basis of the signal indicative of the output voltage $V_{out}$ of the SMPS 100 and a reference voltage. Following this process, the digital control unit 301 returns to the Idle State after a timeout.

On the other hand, if a transient is detected in process S411, then a further coarse value $D_{cut}$ for the duty cycle control signal is calculated and stored in process S413 by the feed forward compensator 3013.

Although $D_{cut}$ could be calculated in process S413 as 50% of the duty cycle control signal's current value, irrespective of the nature of the input voltage transient (as in process S404), in this embodiment feed forward compensator 3013 calculates a predetermined percentage of the duty cycle control signal's current value where the predetermined percentage is selected depending upon the size of the input voltage transient. More particularly, feed forward compensator 3013 determines which of three levels the input voltage transient falls into (although a different number of levels could be used instead), namely large, medium and small, where Large>4Q+threshold M>2Q+threshold S>threshold In this embodiment, if a large input voltage transient is detected, then feed forward compensator 3013 calculates a coarse value equal to 50% of the current duty cycle control signal value. If a medium transient is detected, then feed forward compensator 3013 calculates a coarse value equal to 75% of the current duty cycle control signal value. If a small transient is detected then, feed forward compensator 3013 calculates a coarse value equal to 87.5% of the current duty cycle control signal value. This gives a graded response to the input voltage transient depending upon its size.

It should be noted that these percentage values are calculated by feed forward compensator 3013 by applying a plurality of bit shift operations and combining the results. For example a value of 75% is calculated by a shift and add strategy, for example:

$$0.75 = 2^{-1} + 2^{-2} = 0.5 + 0.25$$

This bit shift and combine way of calculation is much more computationally effective than a pure multiplication.

At process S414, feed forward compensator 3013 starts calculation of a further and more accurate value $D_{new}$ for the duty cycle control signal. As with process S405, the calculation of the more accurate value $D_{new}$ is unlikely to be completed in the time allocated for process S414.

At process S415, feedback compensator 3014 performs feedback compensation based on the signal indicative of the output voltage $V_{out}$ of the SMPS 100 and a reference voltage.

It should be noted that processes S410 and S415 may be performed in sequence or in parallel. Furthermore, if the feedback compensator 3014 and feed forward compensator 3013 are arranged in an integrated manner (for example as described in PCT/EP2010/052468 or PCT/EP2011/051476) then processes S407 and S409 may be performed in an integrated way to generate only one value of the control signal.

The process then returns to the Cut Pulse State (on the next switch cycle) to apply $D_{cut}$ S407 and complete the calculation of $D_{new}$ S408.

It will therefore be understood from the description above that consecutive duty cycle control signals are applied by the feed forward compensator 3013 as follows:

$D_{cut}(50\%)$, $D_{new}$, $D_{cut}$, $D_{new}$, $D_{cut}$, $D_{new}$, . . . $D_{new}$, $D_{normal}$ . . . .

Experimental Results

The inventors have performed simulation experiments to examine the performance of an SMPS 100 controlled using a digital control unit 300 according to an embodiment of the present invention. Specific attention was paid to the output voltage $V_{out}$ of the SMPS 100 when the input voltage $V_{in}$ was disturbed with a transient.

Figure 6:
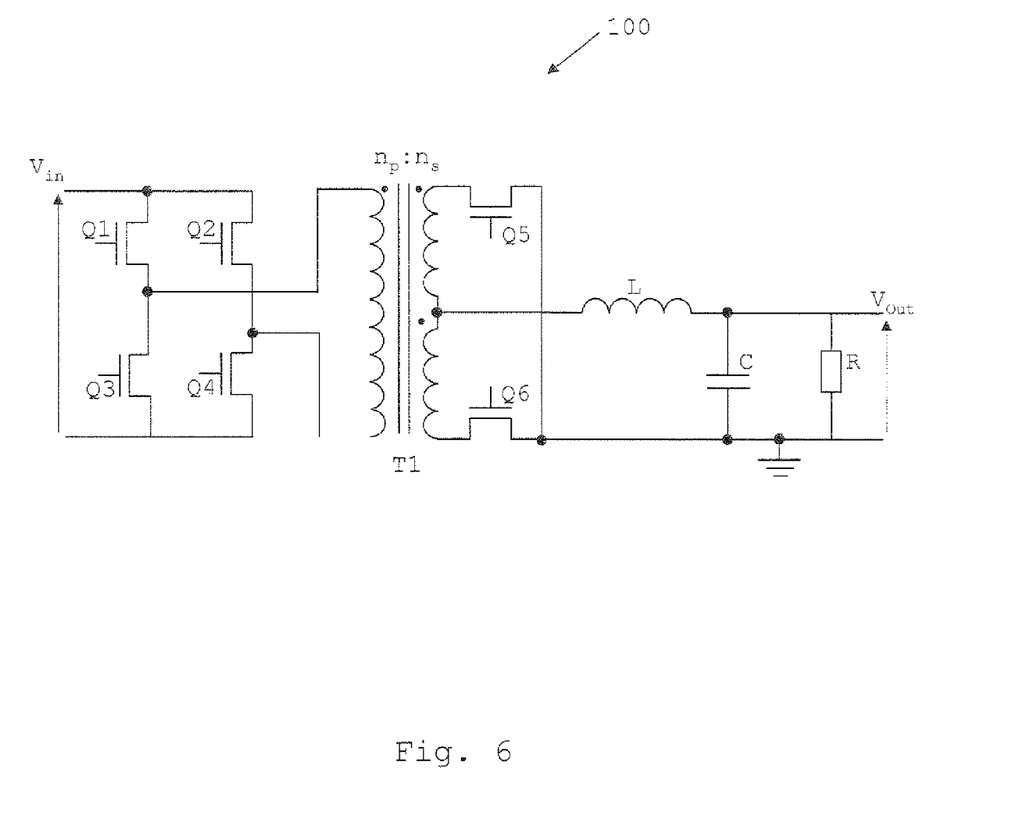
FIG. 6 shows a switched mode power supply that was used during testing of an embodiment of the present invention.

More particularly, FIG. 6 depicts a known SMPS 100 that was used during testing of the digital control unit 300 according to an embodiment of the present invention. The various switching elements Q1-Q6 were controlled using switching signals from DPWM 208 that were based on the output duty cycle control signal D of the digital control unit 300.

Figure 7:
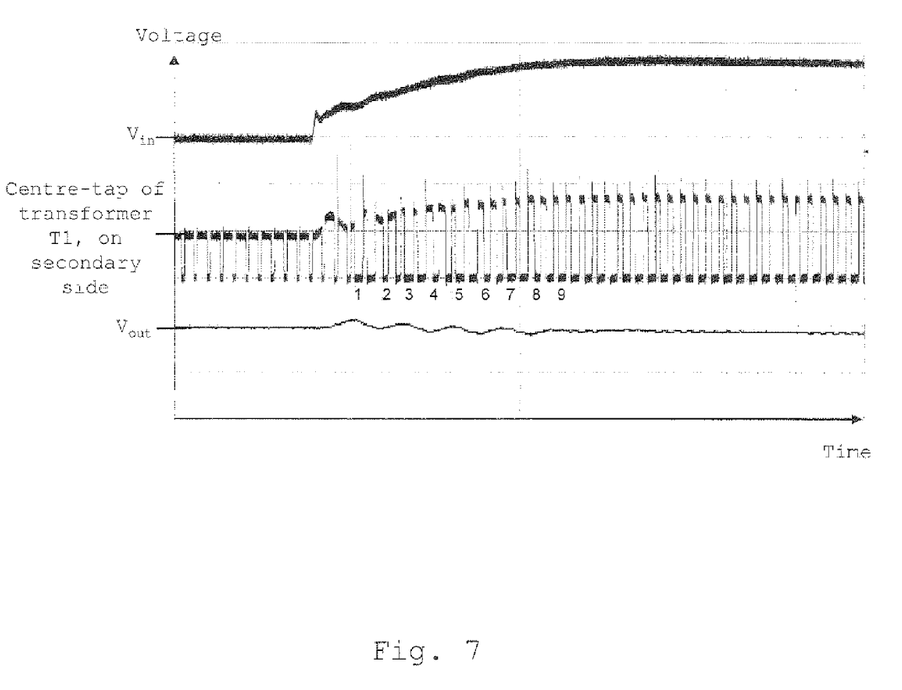
FIG. 7 shows experimental results demonstrating the performance of an SMPS controlled using a digital control unit according to an embodiment of the invention.

FIG. 7 depicts the results of the inventors' experiments. In the depicted graph, the top line is the input voltage $V_{in}$, which is disturbed with a voltage transient. The middle line depicts the voltage present across the centre-tap of the transformer T1 on the secondary side of the transformer T1. The bottom line depicts the output voltage $V_{out}$ of the SMPS 100.

As is clear from FIG. 7, even a large voltage transient produces only a minor ripple in the output voltage $V_{out}$.

Since symmetrical duty cycles are used, then each pulse will appear twice at the switch node. The pulses of voltage across the secondary of the transformer T1 can also be explained by the numbering. The pulse-pairs 1, 3, 5, 7 are $D_{cut}$ pulses. The pulse-pairs 2, 4, 6, 8 are $D_{new}$ pulses and pulse-pair 9 is $D_{normal}$.

As shown in FIG. 7, the pulse-pairs conform to the processes of FIGS. 4, 5a and 5b, with the first pulse being an initial setting of the duty cycle control signal D to $D_{cut}$ at process S407. The second numbered pulse is the $D_{new}$ pulse as shown in process S410. Since the voltage transient is still occurring, then the third numbered pulse is a further $D_{cut}$ pulse followed by a further $D_{new}$ pulse. This process will occur in a loop until the transient has ended. Consequently, the final numbered pulse is the $D_{normal}$ pulse indicating that the voltage transient has ended.

Equations for Calculating $D_{new}$

As described above, more accurate, but processor intensive, equations are used in the calculation of a each more accurate value of the duty cycle control signal $D_{new}$ at processes S405, S408 and S414.

There are many different equations that can be used to calculate the more accurate value $D_{new}$ and the theory behind some examples is described below.

In a buck converter, the ideal duty cycle, D, is equal to:

$$D = \frac{V_{out}}{V_{in}} \quad \text{Equation 2}$$

When the input voltage changes, from $V_{in-old}$ to $V_{in-new}$, the old duty cycle, $D_{old}$, should be scaled to a new duty cycle, $D_{new}$, so the output voltage remains constant.

$$V_{out} = D_{old} V_{in-old} \quad \text{Equation 3}$$
$$= D_{new} V_{in-new}$$

Solving Equation 3 for the new duty cycle $D_{new}$ yields, $$D_{new} = \frac{V_{in-old}}{V_{in-new}} \cdot D_{old} \quad \text{Equation 4}$$

The computations for the compensation condition described above consist of a division followed by a multiplication. Since the division is a more complex operation than a multiplication, in many cases it is preferable to perform the division by a look-up-table operation followed by an additional multiplication, as shown in Equation 5.

$$D_{new} = \frac{1}{V_{in-new}} \cdot V_{in-old} \cdot D_{old} \quad \text{Equation 5}$$

U.S. Pat. No. 7,239,257 B1 discloses the use of a look-up-table for performing such a division.

In addition, U.S. Pat. No. 7,239,257 B1 discloses that when using a feedback unit with an integrator one of the multiplications can be avoided by using a nominal value of $V_{in-old}=V_{in-min}$, where $V_{in-min}$, is the minimum measured input voltage. The look up table is then scaled with $V_{in-min}$.

The calculation of a compensated duty cycle therefore becomes:

$$D_{new} = \frac{V_{in-min}}{V_{in-new}} \cdot D_{old} \quad \text{Equation 6}$$

Another way of solving the divisions is to make the delay in the DPWM proportional against the reciprocal of the input voltage, i.e., a mixed signal solution. This is disclosed by X. Zhang, and D. Maksimovic in "Digital PWM/PFM Controller with Input Voltage Feed-Forward for Synchronous Buck Converters", in Proc. IEEE Appl. Power Electron. Conf. Expo., February 2008, pp. 523-528.

A second set of equations which avoid problems associated with performing a division operation will now be described.

Defining the change in input voltage ΔV as:

$$V_{in-new} = V_{in-old} - \Delta V \quad \text{Equation 7}$$

An approximate feed forward compensation signal can be obtained using the updated duty cycle:

$$D_{new} = D_{old}(1 + \Delta VG) \quad \text{Equation 8}$$
$$= D_{old} + D_{old}\Delta VG$$

In equation 8, the new duty cycle, $D_{new}$, is changed with a factor $(1+\Delta VG)$. The change in the input voltage ΔV is scaled with a factor G. The output voltage becomes:

$$V_{out} = V_{in-new} D_{new} \quad \text{Equation 9}$$
$$= (V_{in-old} - \Delta V) D_{old}(1 + \Delta VG)$$
$$= D_{old} V_{in-old} - D_{old}\Delta V + D_{old}\Delta V G V_{in-old} - D_{old} G(\Delta V)^2$$

Assuming that the gradient in the input voltage is small, the term $D_{old} G(\Delta V)^2$ can be neglected.

The two middle terms of the above equation are eliminated and the output voltage becomes almost unchanged if G is chosen as:

$$G = \frac{1}{V_{in-old}} \quad \text{Equation 10}$$

Thereby the division need not be applied for every sample if it is approximated to a constant gain factor. By choosing a constant G based upon a fixed value of $V_{in-old}$ in the range $V_{in-min} \leq V_{in-old} \leq V_{in-max}$, where $V_{in-min}$ is the minimum measured input voltage and $V_{in-max}$ is the maximum measured input voltage, yields a good approximation in practice.

In a third set of equations, the duty cycle may be updated with a gain factor, C.

$$D_{new} = D_{old}(1 + \Delta VG)$$
$$= D_{old} \cdot C$$
Where, $C = 1 + \Delta VG$ Equation 11

The gain G is calculated as shown in Equation 10 and can be approximated to a constant.

A fourth set of equations is shown below:

$$D_{new} = D_{old} + \Delta VK$$

Equation 12

The output voltage becomes:

$$V_{out} = D_{new} V_{in-new}$$
$$= (D_{old} + \Delta VK)(V_{in-old} - \Delta V)$$
$$= D_{old}V_{in-old} - D_{old}\Delta V + \Delta VKV_{in-old} - K(\Delta V)^2$$

Equation 13

If the gradient of the input signal is small, the term $K(\Delta V)^2$ can be neglected. The two middle terms of Equation 13 are eliminated and the output voltage becomes almost unchanged if:

$$K = \frac{D_{old}}{V_{in-old}}$$

Equation 14

By replacing the old duty cycle with the ideal duty cycle gives:

$$K = \frac{V_{out-old}}{V_{in-old}^2}$$
$$= \frac{V_{out-nom}}{V_{in-old}^2}$$

Equation 15

$V_{out-now}$ is typically the desired output voltage of the SMPS but it could alternatively be a previous measured output voltage.

In order to avoid the division, a constant factor K is preferable. In practice, the inventors have found that choosing a constant $V_{in-old}$ in the range $V_{in-min} \leq V_{in-old} \leq V_{in-max}$ will yield a good approximation. The factor K assumes that the duty cycle is in the range [0, 1]. If another number range is used then scaling will need to be applied.

A multiplierless realization is obtained by implementing the scale factor K as an arithmetic shift.

$$K = 2^N,$$
where,
$$N = \log_2\left(\frac{V_{out-nom}}{V_{in-old}^2}\right)$$

Equation 16

An improved approximation to the ideal factor K can be obtained by using several shifts and additions/subtractions using Canonic Sign Digit Code of the constant K. The calculation, that is performed by a multiplierless shift operation unit, minimizes the number of add/sub operations. Operations with Canonic Sign Digit Code are described for example in U.S. Pat. No. 7,239,257 B1.

Modifications and Variations

Many modifications and variations can be made to the embodiments described above.

For example the values described above relating to thresholds and multiplication factors can all be adjusted depending on the circumstances in which the present invention is applied. For example, the first coarse value $D_{cut}$ for the duty cycle control signal could be 25% or 37.5% of the initial value, instead of 50%, to produce a system with a more aggressive compensation.

The foregoing description of embodiments of the invention has been presented for the purpose of illustration and description. It is not intended to be exhaustive or to limit the invention to the precise form disclosed. Alternations, modifications and variations can be made without departing from the spirit and scope of the present invention.

The invention claimed is:

1. A method of generating a digital control signal for controlling a duty cycle of a switched mode power supply, the method comprising:
    receiving a signal indicative of an input voltage of the switched mode power supply;
    receiving a signal indicative of an output voltage of the switched mode power supply;
    detecting a transient on the received signal indicative of the input voltage of the switched mode power supply; and
    in response to the detection of said transient:
    performing a voltage feedback adjustment of a control signal for controlling the duty cycle of the switched mode power supply by adjusting the control signal in dependence upon the signal indicative of the output voltage;
    in a first stage of feed forward compensation, performing a coarse voltage feed forward adjustment of the control signal for controlling the duty cycle of the switched mode power supply by setting a value of the control signal to a first value derived by performing a first at least one bit shift operation on the value of the control signal; and
    in a second stage of feed forward compensation, performing a more accurate voltage feed forward adjustment of the control signal for controlling the duty cycle of the switched mode power supply by setting the value of the control signal to a second value calculated in dependence upon the signal indicative of the input voltage of the switched mode power supply;
    wherein the first and second stages of the feed forward compensation are performed such that the control signal is set to the first value derived in the first stage before the control signal is set to the second value calculated in the second stage.

2. The method according to claim 1, wherein the coarse and more accurate voltage feed forward adjustments of the control signal are performed such that:
    in a first switch cycle of the switch mode power supply:
        the first value for the control signal is derived by performing the first at least one bit shift operation on the value of the control signal, and the first value is stored for subsequent application; and
        calculation is started for the second value of the control signal in dependence upon the signal indicative of the input voltage of the switched mode power supply;
    in a second switch cycle of the switch mode power supply, the second switch cycle being a next switch cycle after the first switch cycle:

the control signal is adjusted by applying the first value for the control signal stored during the first switch cycle; and calculation of the second value of the control signal is completed and the calculated second value is stored for subsequent application; and in a third switch cycle of the switch mode power supply, the third switch cycle being a next switch cycle after the second switch cycle:

the control signal is adjusted by applying the second value for the control signal stored during the second switch cycle.

3. The method according to claim 2, wherein, the voltage feedback adjustment of the control signal is performed in at least one of the first switch cycle and the second switch cycle.

4. The method according to claim 2, wherein the first switch cycle comprises a switch cycle during which the transient is detected.

5. The method according to claim 2, further comprising:

detecting if the transient is still present on the signal indicative of the input voltage of the switched mode power supply after the voltage feedback adjustment of the control signal, the coarse voltage feed forward adjustment of the control signal, and the more accurate voltage feed forward adjustment of the control signal have been performed; and in response to the detection of the transient after the voltage feedback adjustment, the coarse voltage feed forward adjustment, and the more accurate voltage feed forward adjustment have been performed:

performing a further coarse voltage feed forward adjustment of the control signal by adjusting the control signal to a third value derived by performing a second at least one bit shift operation on the value of the control signal so as to change the value of the control signal by a predetermined amount selected in dependence upon a size of the detected transient; and performing a further more accurate voltage feed forward adjustment of the control signal by setting the control signal to a fourth value calculated in dependence upon the signal indicative of the input voltage of the switched mode power supply.

6. The method according to claim 5, wherein the further coarse and further more accurate voltage feed forward adjustments of the control signal are performed such that:

in the third switch cycle of the switch mode power supply:
the third value for the control signal is derived by performing the second at least one bit shift operation on the value of the control signal to derive the third value for the control signal adjusted by the predetermined amount selected in dependence upon the size of the detected transient, and the derived third value is stored for subsequent application; and calculation is started for the fourth value of the control signal in dependence upon the signal indicative of the input voltage of the switched mode power supply;

in a fourth switch cycle of the switch mode power supply, the fourth switch cycle being a next switch cycle after the third switch cycle:

the control signal is adjusted by applying the third value for the control signal stored during the third switch cycle; and calculation of the fourth value of the control signal is completed and the calculated fourth value is stored for subsequent application; and in a fifth switch cycle of the switch mode power supply, the fifth switch cycle being a next switch cycle after the fourth switch cycle:

the control signal is adjusted by applying the fourth value stored during the fourth switch cycle.

7. The method according to claim 6, wherein voltage feedback adjustment of the control signal is performed in at least one of the third switch cycle and the fourth switch cycle.

8. The method according to claim 1, wherein the first value for the coarse voltage feed forward adjustment of the control signal is calculated by performing a plurality of bit shift operations on the value of the control signal and combining a result of each shift.

9. A digital control unit operable to control a duty cycle of a switched mode power supply, the digital control unit comprising:

a feedback compensator arranged to receive a signal indicative of an output voltage of the switched mode power supply and operable to adjust a control signal for controlling the duty cycle of the switched mode power supply in dependence upon the signal indicative of the output voltage;

a feed forward compensator operable to receive a signal indicative of an input voltage of the switched mode power supply and operable to perform a coarse adjustment of the control signal for controlling the duty cycle of the switched mode power supply by setting a value of the control signal to a first value derived by performing a first at least one bit shift operation on the value of the control signal and operable to perform a more accurate adjustment of the control signal for controlling the duty cycle of the switched mode power supply by setting the value of the control signal to a second value calculated in dependence upon the signal indicative of the input voltage;

a transient detector operable to receive the signal indicative of the input voltage of the switched mode power supply and operable to detect a transient on the received signal indicative of the input voltage of the switched mode power supply; and a controller operable to control the operation of the feedback compensator and the feed forward compensator in dependence upon the detection of the transient by the transient detector, such that, in response to the detection of the transient by the transient detector:

in a feedback duty cycle control process, the feedback compensator adjusts the control signal for controlling the duty cycle of the switched mode power supply in dependence upon the signal indicative of the output voltage;

in a first stage of feed forward compensation comprising a coarse voltage feed forward duty cycle control process, the feed forward compensator adjusts the control signal to the first value derived by performing the first at least one bit shift operation on the value of the control signal; and in a second state of feed forward compensation comprising a more accurate voltage feed forward cycle control process, the feed forward compensator adjusts the control signal to the second value calculated in dependence upon the signal indicative of the input voltage of the switched mode power supply;

wherein the feed forward compensator performs the first and second stages of the feed forward compensation such that the control signal is set to the first value derived in the first stage before the control signal is set to the second value calculated in the second stage.

10. The digital control unit according to claim 9, wherein the controller is arranged to control the operation of the feed forward compensator such that:

in a first switch cycle of the switch mode power supply:
the feed forward compensator derives the first value for the control signal by performing the first at least one bit shift operation on the value of the control signal, and stores the derived first value for subsequent application; and
the feed forward compensator starts calculating the second value of the control signal in dependence upon the signal indicative of the input voltage of the switched mode power supply;

in a second switch cycle of the switch mode power supply, the second switch cycle being a next switch cycle after the first switch cycle:
the feed forward compensator adjusts the control signal by applying the first value for the control signal stored during the first switch cycle; and
the feed forward compensator completes calculation of the second value of the control signal and stores the calculated second value for subsequent application; and in a third switch cycle of the switch mode power supply, the third switch cycle being a next switch cycle after the second switch cycle:
the feed forward compensator adjusts the control signal by applying the second value for the control signal stored during the second switch cycle.

11. The digital control unit according to claim 10, wherein the controller is arranged to control the operation of the feedback compensator such that, in at least one of the first switch cycle and the second switch cycle, the feedback compensator performs the feedback duty cycle control process by adjusting the control signal for controlling the duty cycle of the switched mode power supply in dependence upon the signal indicative of the output voltage.

12. The digital control unit according to claim 10, wherein the first switch cycle comprises the switch cycle during which the transient is detected by the transient detector.

13. The digital control unit according to claim 10, wherein:
the transient detector is further arranged to detect if the transient is still present on the signal indicative of the input voltage of the switched mode power supply after the feedback duty cycle control process, the coarse voltage feed forward duty cycle control process, and the more accurate voltage feed forward duty cycle control process have been performed; and
the controller is further arranged to control the operation of the feed forward compensator such that, in response to the detection of the transient by the transient detector after the feedback duty cycle control process, the coarse voltage feed forward duty cycle control process, and the more accurate voltage feed forward duty cycle control process have been performed:
in a further coarse voltage feed forward duty cycle control process, the feed forward compensator further adjusts the control signal to a third value derived by performing a second at least one bit shift operation on the value of the control signal so as to change the value of the control signal by a predetermined amount selected in dependence upon a size of the detected transient; and
in a further more accurate voltage feed forward duty cycle control process, the feed forward compensator adjusts the control signal to a fourth value calculated in dependence upon the signal indicative of the input voltage of the switched mode power supply.

14. The digital control unit according to claim 13, wherein the controller is arranged to control the operation of the feed forward compensator such that:

in the third switch cycle of the switch mode power supply:
the feed forward compensator performs the second at least one bit shift operation on the value of the control signal to derive the third value for the control signal adjusted by the predetermined amount selected in dependence upon the size of the detected transient, and stores the derived third value for subsequent application; and
the feed forward compensator starts calculating the fourth value of the control signal in dependence upon the signal indicative of the input voltage of the switched mode power supply;

in a fourth switch cycle of the switch mode power supply, the fourth switch cycle being a next switch cycle after the third switch cycle:
the feed forward compensator adjusts the control signal by applying the third value for the control signal stored during the third switch cycle; and
the feed forward compensator completes calculation of the fourth value of the control signal and stores the calculated fourth value for subsequent application; and in a fifth switch cycle of the switch mode power supply, the fifth switch cycle being a next switch cycle after the fourth switch cycle:
the feed forward compensator adjusts the control signal by applying the fourth value stored during the fourth switch cycle.

15. The digital control unit according to claim 14, wherein the controller is arranged to control the operation of the feedback compensator such that in at least one of the third switch cycle and the fourth switch cycle, the feedback compensator performs the feedback duty cycle control process by adjusting the control signal for controlling the duty cycle of the switched mode power supply in dependence upon the signal indicative of the output voltage.

16. The digital control unit according to claim 9, wherein the feed forward compensator is operable to derive the first value of the control signal for controlling the duty cycle of the switched mode power supply by performing a plurality of bit shift operations on the value of the control signal and combining a result of each shift.

* * * * *